United States Patent [19]

Burke et al.

[11] 4,275,339
[45] Jun. 23, 1981

[54] BIFILAR BRUSHLESS DC MOTOR

[75] Inventors: Michael J. Burke; David W. Collins, both of Rochester, Minn.

[73] Assignee: International Business Machines Corporation, Armonk, N.Y.

[21] Appl. No.: 106,201

[22] Filed: Dec. 21, 1979

[51] Int. Cl.³ .............................................. H02P 6/02
[52] U.S. Cl. .................................. 318/138; 318/254; 318/439; 310/49 R
[58] Field of Search ................... 318/138, 254, 254 A, 318/439, 696; 310/49 R

[56] References Cited

U.S. PATENT DOCUMENTS

| | | | |
|---|---|---|---|
| 3,428,837 | 2/1969 | Morreale et al. | 310/49 R |
| 3,482,156 | 12/1969 | Porath | 310/49 R |
| 3,621,312 | 11/1971 | Palmero | 310/49 R |
| 3,663,877 | 5/1972 | Clark | 318/254 A |
| 4,029,977 | 6/1977 | Chai et al. | 318/138 |
| 4,125,792 | 11/1978 | Schmider | 318/254 A |
| 4,127,801 | 11/1978 | Leenhouts | 318/696 |

OTHER PUBLICATIONS

Byte, vol. 4, No. 2, Feb. 1979, p. 105.

Primary Examiner—J. V. Truhe
Assistant Examiner—John W. Redman
Attorney, Agent, or Firm—Robert W. Lahtinen

[57] ABSTRACT

A brushless D. C. motor is disclosed having two bifilar winding wire pairs with each bifilar pair forming alternate windings. Each winding is switched by a transistor which has a back poled diode connected in parallel therewith. The control circuit sequences energization of single windings with each winding energized being in a different bifilar pair than the next preceding energized winding whereby when a transistor is switched off the other winding of the bifilar pair and the associated back poled diode protect the transistor and provide an energy conserving/heat eliminating path for the induced current. Each winding is further formed of a pair of subwindings having an angle of separation therebetween approximately half the angular separation between adjacent windings.

5 Claims, 6 Drawing Figures

4,275,339

BIFILAR BRUSHLESS DC MOTOR

DESCRIPTION

TECHNICAL FIELD

The invention is directed to brushless D.C. motors and more particularly a winding configuration and control circuitry that increase efficiency and reduce heat generation while protecting circuit components against excessive voltages.

A D.C. motor is usually wound using independent windings without regard for the need or advantage associated with the balancing of cross coupled induced voltages. In brushless DC motor designs a common method of protection for the switching transistors, used to selectively energize the windings, is the provision of a diode in association with each winding or such diode in association with each winding in conjunction with a common zener diode. Diode protection may take the form of individual diode circuits from each winding circuit intermediate the winding and switching transistor to a power source having a higher potential than the supply voltage. By using a common zener diode connected in series with the individual diode circuits, the power source connection can be made to the winding power supply to thereby avoid the provision of an additional power supply voltage. This circuit requires the expense of the zener diode which is used solely to dissipate energy that not only creates heat and requires cooling, but also consumes energy without useful result other than circuit protection.

SUMMARY

In the present invention the stator is bifilar wound with, as shown in the description, at least two bifilar pairs wound to provide alternate pairs of windings about the stator periphery. The switching is accomplished with transistors that have a reverse poled diode respectively connected in parallel with each transistor. Such a diode is often used to provide a path around the transistor to afford protection for the transistor against reverse voltage transients from any source that may appear in an inductive drive circuit. The cooperating rotor surrounds the stator and presents permanent magnet pole faces that confront the stator.

The motor is operated by sequentially energizing single windings with each successively energized winding being in a bifilar winding wire pair different from the pair of the next preceding winding. When a winding is deenergized the decay of the magnetic field induces a reverse flow, back into the power supply, through the other winding of the bifilar pair as a result of the close coupling. This current, permitted by the reverse pole diode, not only protects the transistor which is turned off but also supports the magnetic field in the stator which produces a torque in the same direction as the original current in the winding that was turned off. A capacitor connected between the power supply input and the common connection to the emitters of transistors T1 through T4 conserves the power within the system.

The winding technique used to form windings of the bifilar winding pairs includes the use of overlapping subwindings whose axes are separated by an angle of approximately one-half the angle separating the axes of symmetry of adjoining winding pairs. This construction permits not only the generation of an angularly narrower magnetic pole with higher torque per ampere, but in addition produces a more compact winding configuration.

DRAWINGS

DETAILED DESCRIPTION

Figure 1:
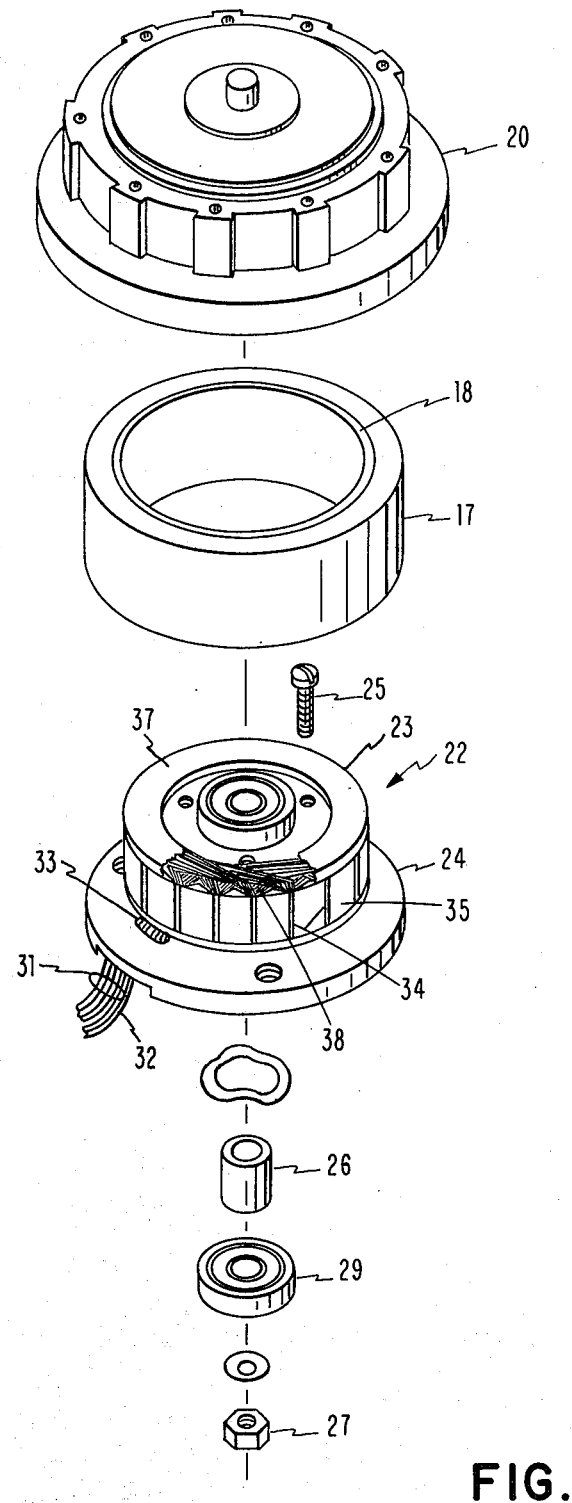
FIG. 1 is an exploded view of a motor including rotor and stator assemblies.

Referring to the drawings, FIG. 1 shows an exploded view of the principal parts of the motor. The rotor includes a ring 17 of magnetically permeable metal with a ring 18 of permanent magnet material bonded to the interior cylindrical surface of ring 17. The ring 18 of magnetic material has formed therein four permanent magnet poles at 90° intervals with like poles being 180° apart. The metal ring 17 is pressed into the housing 20 to constrain the housing 20 and rings 17, 18 to rotate in unison. The stator 22 includes the core lamination winding assembly 23 and a base 24 which are interconnected by three bolts 25. Housing 20 has a depending central shaft (not shown) which extends through a sleeve 26 and is secured by a nut 27. The sleeve 26 is pressed into the inner races of bearings 29 and to permit the rotor to rotate freely about stator 22 with the ring 18 of magnetic material surrounding the stator core lamination/winding assembly 23. The winding individual leads 31 and the common lead 32 extend from the terminal stator slot locations through a slotted opening 33 in base 24. The wires are wound through the slots 34 in the core laminations 35 in accordance with the sequence of steps shown in FIG. 2. The bifilar winding wire pairs are wound about the core lamination stack 34 and thereafter the windings 38 are compressed or crushed to reduce their volume and potted in epoxy 37.

Figure 2:
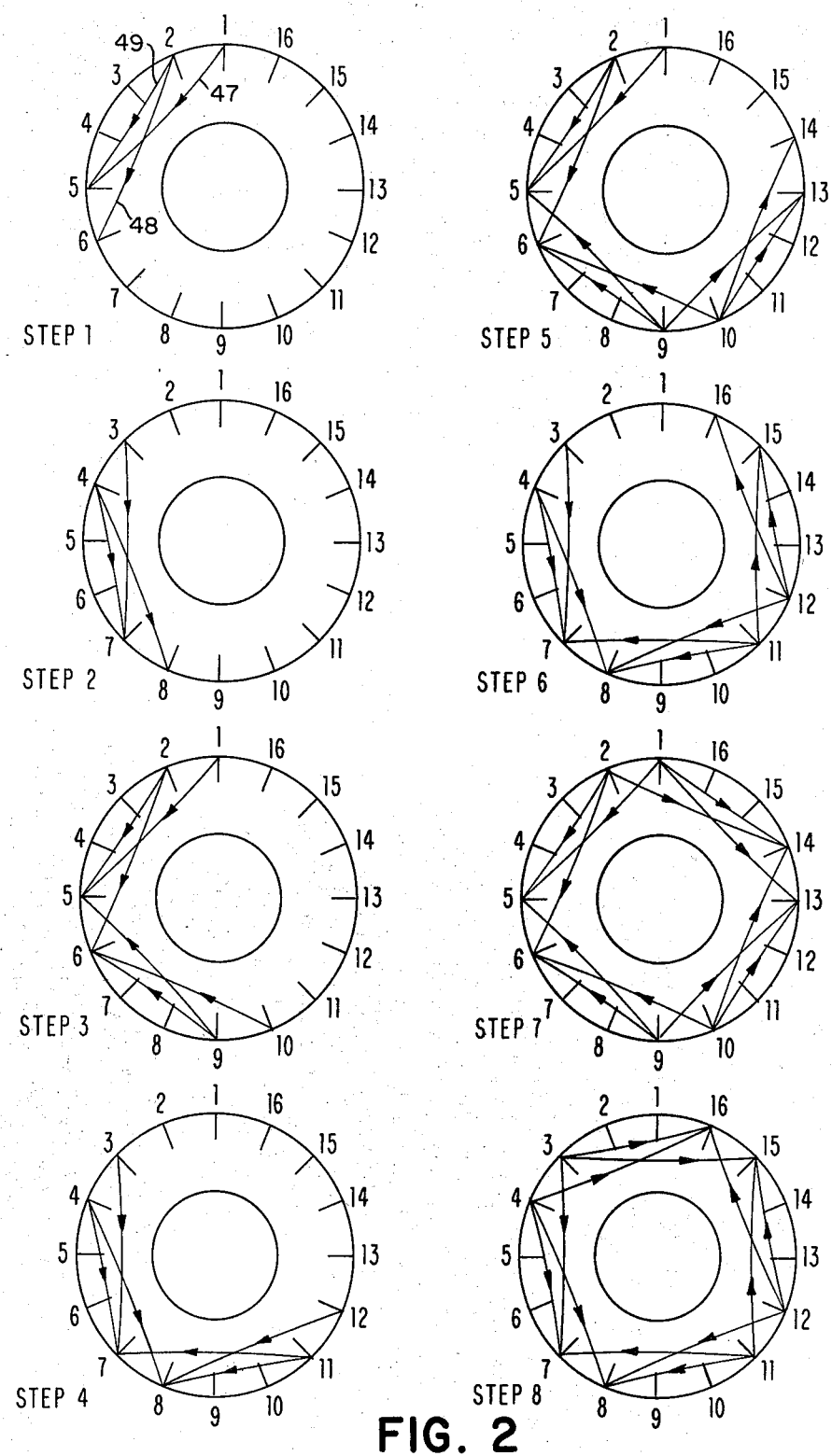
FIG. 2 schematically illustrates the sequence of winding the bifilar winding pairs on the stator corein accordance with the instant invention.

FIG. 2 shows the steps used in winding the two bifilar winding wire pairs on the stator with the stator slot locations indicated by the numbers 1 through 16 about the periphery of the ring 36 which represents a bottom view of the core lamination stack.

Steps 1, 3, 5 and 7 show the windings location of the phase 1 (P1) and phase 3 (P3) bifilar winding wire pair and steps 2, 4, 6 and 8 illustrate the winding locations of the phase 2 (P2) and phase 4 (P4) bifilar winding wire pair. With reference to step 1, the P1/P3 wires are wound with the initial half of the windings 47 through slots 1 and 5, the final half of the windings 48 through slots 2 and 6 and the lead 49 being finally terminated in slot 5. The termination in slot 5 places the P1/P3 wires in position to start the next sequence of windings using this winding wire pair in step 3. Referring now to step 2, the winding wire bifilar pair composed by phase 2

(P2) and phase 4 (P4) winding wires are wound with the first half of the first winding turns through slots 3 and 7 (starting from slot 3), the second half of the first winding turns through slots 4 and 8 and terminating at slot 7 in preparation for step 4 when the next winding of P2/P4 is initiated. In step 3 the P1/P3 pair is wound with the initial half of the winding turns between slots 5 and 9, the second half of the winding turns between slots 6 and 10 and terminating at slot 9. At step 4 bifilar pair P2/P4 is wound with the initial half of the turns between slots 7 and 11, the final half of the turns between slots 8 and 12 and terminates at slot 11. During step 5 the P1/P3 pair is wound to form a subwinding of half the turns using slots 9 and 13 followed by a subwinding of half the turns using slots 10 and 14 and terminating at slot 13. Using the P2/P4 bifilar pair in step 6 the initial half number of turns are formed using slots 11 and 15, the final half number of turns use slots 12 and 16 and the wire pair is terminated through slot 15. The final winding of wire pair P1/P3 is wound by halves using slots 13 and 1 and thereafter using slots 14 and 2 with the wires finally extending through slot 1. Accordingly the P1/P3 wires both start and terminate the four winding set by passing through slot 1. Finally in step 8 the subwindings of the P2/P4 wire pair are wound in slots 15 and 3 followed by 16 and 4 and terminate through slot 3 whereby these wire pairs both start and end by passing through slot 3.

Figure 3:
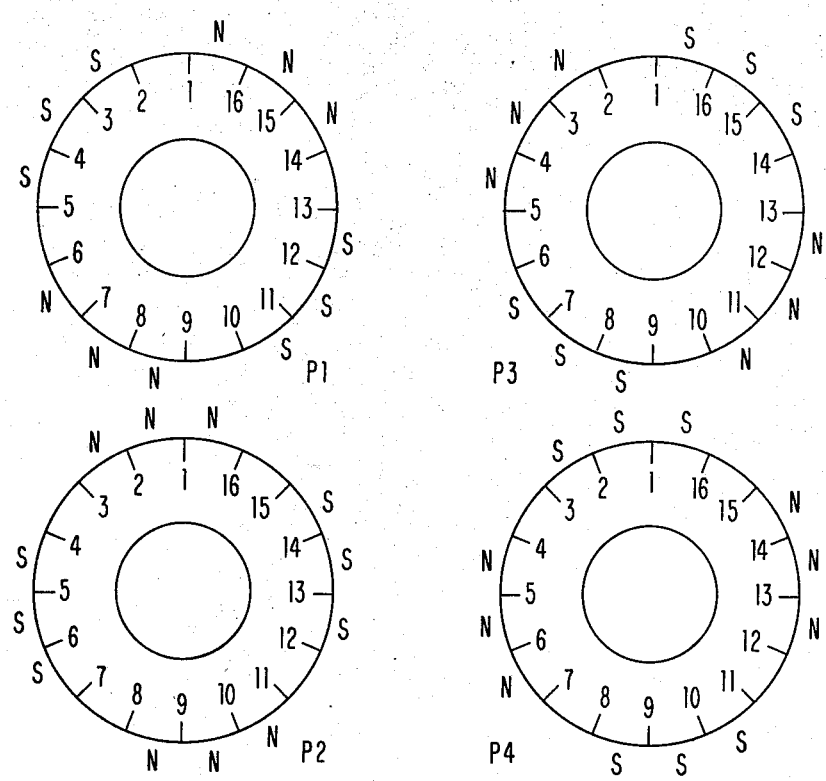
FIG. 3 shows the pole positions established by energizing each of the windings and the progression of the poles by sequential energization of the windings.

FIG. 3 shows the magnetic pole patterns created by energizing the winding phases P1 through P4. By sequencing the energization of the windings in the order P1, P2, P3, P4 the pole pattern processes in a counterclockwise direction in 45° increments with each winding phase change. Similarly a clockwise procession would be established by a P4, P3, P2, P1 sequence.

Figure 5:
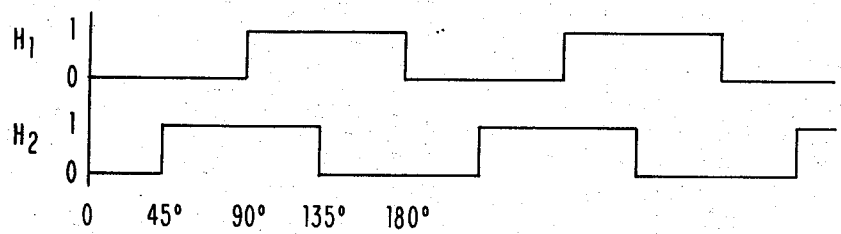
FIG. 5 is a timing diagram of the relationship of the input signals to the circuit of FIG. 4 as a function of rotor rotation.
Figure 4:
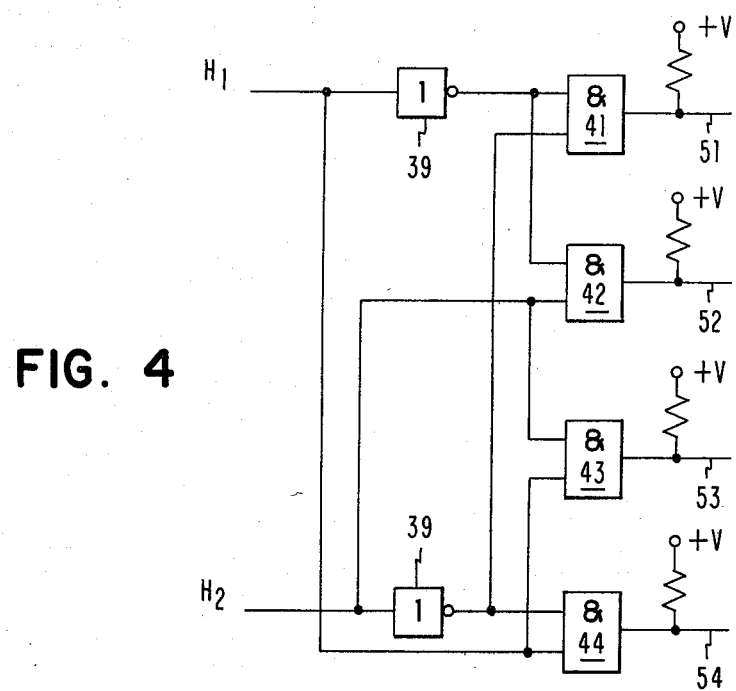
FIG. 4 shows a logic circuit for controlling the energizing of the windings.

FIG. 4 schematically illustrates the circuit for energizing the bifilar winding phases using a pair of trains of clock pulses H1 and H2 (FIG. 5) which are 45° out of phase with one another. The true and complement values of the H1 and H2 input signals are generated using inverters with the various combinations of input signals being decoded by open collector AND gates 41, 42, 43 and 44. The 2 bit decode of H1 and H2 signals yields the 4 unique combinations which respectively activate windings P1, P2, P3 or P4 in the proper sequence. As shown in FIG. 5 the combination of input signals or pulses gives a P1, P2, P3, P4 phase sequence.

Figure 6:
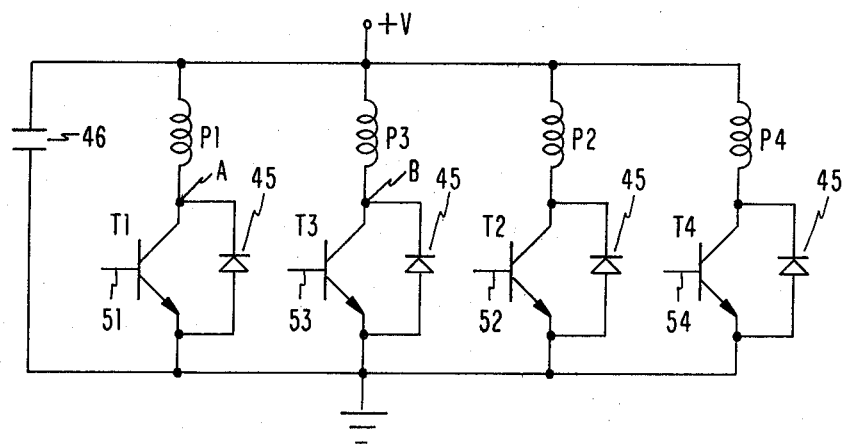
FIG. 6 shows the motor windings circuit including the switching transistors and back poled protection diodes.

FIG. 6 illustrates the circuit for controlling the energization of the windings wherein transistors T1, T2, T3 and T4 function as switches for turning on and turning off the current flow to windings P1, P2, P3 and P4 respectively. Each of the switching transistors T1 through T4 has respectively connected in parallel therewith a reverse poled diode 45. Also connected between the input voltage +V and ground in parallel with the windings P1 through P4 is a capacitance 46.

During operation, the motor windings are sequenced by energizing the lines 51, 52, 53 and 54 singly in that order. When T1 has been on causing a current to flow through winding P1 and is turned off, the potential at node A starts to increase. To prevent a potential increase at node A from damaging transistor T3 the reverse poled diodes 45 are provided. When the potential at node A rises and the potential at node B drops until the diode in parallel with transistor T3 turns on effectively preventing a further rise of the potential at node A. The close coupling of the other winding P3 of the bifilar pair and the presence of the reverse poled diode 45 in parallel with transistor T3 permits a current to flow through winding P3, which is wired in the reverse direction, into the power supply. The capacitor effectively stored the energy which is transferred to the power supply by the reverse flow. Accordingly, the diode in parallel with transistor T3 effectively protects the transistor T1 against damage that might occur if the potential at node A were to rise excessively. In addition the ability of winding P3 to conduct a reverse flow of current to the power supply not only conserves energy otherwise wasted, but also reduces the heat dissipation problems occasioned by the dissipation of energy through a resistance.

Since the sequence of energized windings causes windings to be consecutively energized in different bifilar winding pairs; as shown, alternately between the two bifilar pairs, the diode protection of the switching transistors is fully effective and the induced current in the closely coupled and reverse wired other bifilar winding of the pair produces a torque in the same direction that assists the desired operation.

While the invention has been particularly shown and described with reference to a preferred embodiment thereof, it will be understood by those skilled in the art that various changes in form and details may be made therein without departing from the spirit and scope of the invention.

Having thus described our invention, what we claim as new, and desire to secure by Letters Patent is:

1. A brushless D.C. motor including a stator element and a rotor element comprising:
   a plurality of bifilar winding wire pairs,
   a series of angularly spaced dual windings mounted on said stator with each successive dual winding formed by coiling a different winding wire pair, whereby each winding wire pair forms a plurality of angularly spaced dual windings mounted on said stator in angular spaced positions and separated by dual windings formed by a different winding wire pair,
   each said dual winding being formed of two bifilar wound subwindings which overlap one another and have subwinding axes separated by an angle approximately half the angular separation between axes of symmetry of adjoining dual windings,
   means connecting each windings in parallel to a potential source,
   switch means in each winding circuit for energizing the associated winding,
   diode means in each winding circuit, each respectively connected in parallel with said switch means to permit a reverse flow of current through the associated winding that bypasses said switch means, and
   means for sequentially energizing said windings in such manner that at any stage of the sequence the next previous winding energized and the next subsequent winding energized is formed from a different winding wire pair.

2. The brushless D.C. motor of claim 1 wherein each of said switch means comprises a transistor which is rendered conductive by a signal generated by said means for sequentially energizing said windings.

3. The brushless D.C. motor of claim 2 wherein said dual windings are formed of two of said winding wire pairs whereby the winding pairs are sequentially formed by alternately coiling one then the other of said winding wire pairs in angularly spaced relation.

4. The brushless D.C. motor of claim 3 wherein said stator element is circular with the dual windings mounted thereon about the periphery thereof and said rotor element is concentrically mounted about said stator with permanent magnet poles confronting said stator.

5. The brushless D.C. motor of claim 3 further comprising:
two bistable input signals and wherein said means for sequentially energizing said windings comprises circuit means for decoding said bistable input signals into four mutually exclusive signals respectively connected to said transistors.

* * * * *